United States Patent [19]

Schleusener

[11] Patent Number: 4,864,007

[45] Date of Patent: Sep. 5, 1989

[54] HIGH MOLECULAR WEIGHT LINEAR POLYMERS OF DIALLYLAMINES AND PROCESS FOR MAKING SAME

[75] Inventor: Eckart Schleusener, Reinach, Switzerland

[73] Assignee: Sandoz Ltd., Basel, Switzerland

[21] Appl. No.: 68,462

[22] Filed: Jun. 30, 1987

[30] Foreign Application Priority Data

Jul. 2, 1986 [DE] Fed. Rep. of Germany ....... 3622122

[51] Int. Cl.$^4$ ............................ C08F 4/04; C08F 26/06
[52] U.S. Cl. .................................. 526/218.1; 526/259
[58] Field of Search ................... 526/218.1, 259; 8/543

[56] References Cited

U.S. PATENT DOCUMENTS

| | | | |
|---|---|---|---|
| 3,288,770 | 11/1966 | Butler | 260/88.3 |
| 4,329,441 | 5/1982 | Bergthaller | 526/193 |
| 4,504,640 | 3/1985 | Harada et al. | 526/193 |
| 4,583,989 | 4/1986 | Ueda et al. | 8/543 |
| 4,678,474 | 7/1989 | Ueda et al. | 8/543 |

FOREIGN PATENT DOCUMENTS 140309  5/1985  European Pat. Off. .

*Primary Examiner*—Joseph L. Schofer
*Assistant Examiner*—N. Sarofim
*Attorney, Agent, or Firm*—Gerald D. Sharkin; Richard E. Vila; Thomas C. Doyle

[57] ABSTRACT

Diallylamine compounds may be polymerized to water-soluble, linear, high-molecular weight polymers having low residual monomer content by the use of cationic azo initiators and phosphorous acid or a derivative thereof as regulator. The polymers are useful as pre- or after-treatment agents for anionic dyeings on textile substrates.

28 Claims, No Drawings

HIGH MOLECULAR WEIGHT LINEAR POLYMERS OF DIALLYLAMINES AND PROCESS FOR MAKING SAME

This invention relates to homopolymerization of diallylamine and its derivatives.

It has long been known that allyl compounds are generally difficult to polymerize by free-radical or ionic polymerization reactions. The polymerization of monoallylamine salts by free-radical initiators such as azo compounds and peroxides in aqueous media generally gives only low molecular weight polymers, whereas the polymerization under similar conditions of bifunctional diallylamine salts generally gives crosslinked gel-like polymers.

U.S. Pat. No. 4,504,640 describes the production of high molecular weight homopolymers of monoallylamine using initiators having in their molecule an azo group and a group having a cationic nitrogen atom, (hereinafter referred to as cationic azo intiators) the polymerization being carried out in aqueous acid medium.

European Patent Application 140 309 describes the production of high molecular weight copolymers of monoallylamine with diallylamine or its derivatives by use of the same initiators. The production of a homopolymer of diallylamine by this method is not described in these patent applications or elsewhere, and it is found that when it is attempted to polymerize diallylamines by this method, solid, water-insoluble, gel-like polymers without useful properties are obtained.

It has now been found that useful water-soluble high molecular weight linear homopolymers of diallylamines may be obtained by polymerization of diallylamine salts with cationic azo initiators in the presence of regulators.

Accordingly, the present invention provides a process for the production of a water-soluble, high molecular weight linear homopolymer of a diallylamine comprising the step of polymerizing a diallylamine salt in a polar solvent in the presence of a cationic azo initiator and of a regulator. The invention further provides the novel polymers so obtained.

Preferred diallylamine salt monomers are those of formula I

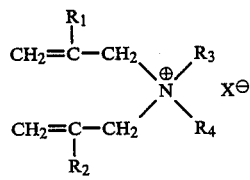

in which
R$_1$ and R$_2$ are independently hydrogen or methyl;
R$_3$ and R$_4$ are independently hydrogen; C$_{1-5}$ alkyl unsubstituted or monosubstituted with hydroxy, cyano, amino, C$_{1-5}$ alkylamino or di(C$_{1-5}$ alkyl)amino; benzyl; or cyclohexyl; or R$_3$ and R$_4$, together with the nitrogen atom to which they are attached, form a piperidine or morpholine ring; and
X$^\ominus$ is an anion.

Preferably R$_1$ and R$_2$ are hydrogen. Preferably R$_3$ and R$_4$ are independently hydrogen, C$_{1-3}$ alkyl, 2-hydroxyethyl or 2-cyanoethyl, more preferably hydrogen. Preferably X$^\ominus$ is Cl$^\ominus$, Br$^\ominus$, I$^\ominus$, NO$_3^\ominus$, HSO$_4^\ominus$ or H$_2$PO$_4^\ominus$.

By the term "homopolymer" is meant in this context a polymer in which all of the monomer units are diallylamine units (even though they need not be identical), in contradistinction to the monoallylamine/diallylamine copolymers of EPA 140 369. Thus what would normally be termed a copolymer of for example diallylamine with N-methyldiallylamine is regarded as a "homopolymer" as defined in this specification.

Cationic azo initiators, that is, initiators having in the molecule both an azo group and a group containing a cationic nitrogen atom, are preferably of formula II $$(R_5\text{---}N\!\!=\!\!N\text{---}R_6)^{n\oplus}(X^\ominus)_n \qquad \text{II}$$

in which R$_5$ and R$_6$ are independently alkyl, aryl, alkaryl, or aralkyl, optionally substituted by cyano, at least one of which is substituted by a group containing a cationic nitrogen atom, or R$_5$ and R$_6$ together form an alkylene, alkylalkylene or arylalkylene group substituted by a group containing a cationic nitrogen atom, and X$^\ominus$ is an anion, preferably Cl$^\ominus$. Groups containing a cationic nitrogen atom are preferably amino or amidino groups.

Cationic azo initiators suitable for use in the process of this invention include, but are not limited to, those described in U.S. Pat. No. 4,504,640 and European patent application 145 220, the disclosures of which are incorporated herein by reference. Particularly preferred initiators are 2,2'-azo-bis(2-aminopropane) dihydrochloride, 2,2'-azo-bis (2-amidinobutane) dihydrochloride, 2,2'-azo-bis(N-phenylamidinopropane) dihydrochloride, 2,2'-azo-bis(N,N-dimethylamidinopropane) dihydrochloride, 2,2'-azo-bis(N-hydroxyethylamidinopropane) dihydrochloride, and 2,2'-azo-bis(2-imidazolinylpropane) dihydrochloride.

The initiators are used in amounts of from 0.2% to 10% by weight based on the weight of monomer used, preferably from 1 to 5% by weight.

As regulator may be used any free-radical chain transfer agent having sufficient water solubility, e.g. mercaptans. Preferably however the regulator is phosphorous acid or a derivative thereof, for example organic phosphite esters. Phosphorous acid itself is particularly preferred. The amount of regulator used is from 0.01 to 0.5 molar equivalents, preferably 0.025 to 0.2 molar equivalents based on the monomeric diallyl compound used.

Except for the particular combination of monomer, initiator and regulator, the polymerization is carried out under conditions known for the polymerization of allyl compounds, in a polar solvent, preferably water, and preferably at a pH regulated by addition of acid to lie within the range 1.5–5, more preferably 2–3. Accordingly, both the cationic monomer and the cationic azo initiator will be present in the reaction mixture in salt form, even if they are added in free base form. Similarly if phosphorous acid or an acid phosphite ester are used as regulator, they will be present in free acid form, even if originally added in the form of a salt, e.g. as sodium phosphite.

An acid solution of the monomer and the regulator is preferably heated from 50° to 80° C. under nitrogen, the initiator is added in small portions and the polymerization is concluded at the boiling point. The acid solution is preferably a solution of a mineral acid e.g. hydrochloric or sulphuric acid, more preferably hydrochloric acid. The polymer is produced in salt form and may be obtained in the form of the free base by adding an alkali, for example sodium hydroxide, to the cooled solution. The polymeric product, in free base or acid salt form, may be isolated by standard methods.

Homopolymers prepared according to the invention are believed to contain repeating units of formula III and/or IV

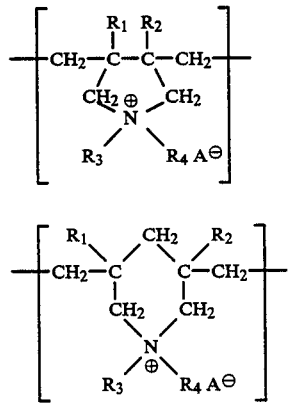

or the corresponding free base forms. The polymers are predominantly linear, show little or no tendency to cross-linking and have little or no residual monomer content (preferably less than 3% by weight). Even in the free base form they have high solubility in water, in contrast to crosslinked diallyl polymers which are highly viscous and have very poor solubility either in the free base or the salt form. The polymers of the invention, in hydrochloride salt form, show a Brookfield viscosity of from 500 mPa (spindle No. 4, 100 rpm) to 10 Pa (spindle No. 4, 10 rpm) in 55–65% weight aqueous solution at room temperature. In free base form, a 20–30% aqueous solution has a Brookfield viscosity from 100 mPa (spindle 3, 100 rpm) to a 2 Pa (spindle No. 4, 100 rpm).

The polymers according to the invention are useful as textile treatment agents, preferably as after-treatment agents for the fixation of dyeings and printings with anionic dyestuffs such as direct or reactive dyes upon hydroxy group- or nitrogen-containing textile substrates. Suitable substrates include natural or synthetic polyamides such as wool, silk and nylon; and cellulosic materials such as cotton and rayon. Preferred substrates are those containing or consisting of cotton fibres. Preferred dyestuffs are those described in British patent application 2 163 760 A.

The polymers may be applied from aqueous solution by conventional methods for example exhaust or padding. The amount of polymer required is variable and depends on the type of dye and the depth of shade. For dyeings with direct dyes, quantities of from 0.5% to 6%, more preferably 2–4% by weight based on the dry substrate are preferably applied by exhaust methods, and for application by padding preferred amounts of polymer are from 5–60 g/l of the padding liquor, more preferably 20–40 g/l. For reactive dyes, exhaust application is preferred in quantities of from 0.5% to 6%, more preferably 0.5–3%, particularly 0.5–1% of the dry weight of substrate.

A preferred aftertreatment process using exhaust application is carried out by immersing the dyed textile substrate at room temperature in a fixing bath containing the diallylamine homopolymer, sodium chloride and sufficient alkali to give a pH of approx. 12–13, and warming the bath to 60° C. The bath is held at this temperature for about 15 minutes, then the substrate is removed from the bath, rinsed and neutralized.

This aftertreatment considerably improves the wet fastness properties of direct dyeings, for example their waater-, wash- and sweat-fastness properties. In comparison with other known aftertreatments, the process according to the invention has the advantage of giving a particularly long-lasting effect, with minimal change of shade and little influence upon the light fastness of the dyeings. On dyeings with reactive dyes, the aftertreatment causes wash-fast fixation of the hydrolysed portion of the dye, making it unnecessary to remove this by soaping at the boil. In addition the fastness to perborate is improved.

An alternative use of the polymers according to the invention is as pre-treatment agents for textile substrates containing nitrogen atoms or hydroxy grops, in order to improve subsequent dyeings with direct or reactive dyes. In this way dyeings of deeper shades may be obtained, and in addition it is made possible to fix reactive dyes in the acid pH range. For such pre-treatment, preferred quantities of polymer are 0.5–15%, more preferably 0.5–6%, most preferably 2–6%, based on the dry weight of substrate. Application is preferably by exhaust methods.

The invention is illustrated by the following Examples, in which all temperatures are in degrees centigrade and all parts and percentages are by weight.

EXAMPLE 1

To 193.9 parts of a solution of diallylamine hydrochloride in water (68.85% concentration) is added 8.2 parts phosphorous acid and the mixture is heated to 65° under nitrogen. A solution of 3.5 parts 2,2'-azo-bis-(2-amidinopropane) dihydrochloride in 19.8 parts water is added dropwise over 19 hours. The mixture is stirred for a further 21 hours at 65°, then heated to 95°–100°, stirred for 2 hours and cooled.

The resulting 59.2% solution of polymer hydrochloride has a Brookfield viscosity of 1540 mPa (spindle No. 4, 50 rpm). By addition of 142 parts of 30% aqueous sodium hydroxide with stirring, the free polyamine base is obtained (367 parts of a 26.4% solution). The viscosity of this solution is 630 mPa (Brookfield, spindle No. 4, 100 rpm).

EXAMPLE 2

Example 1 is repeated using 4.1 parts phosphorous acid instead of 8.2 parts. The resulting polymer dihydrochloride solution (60.3%) has a Brookfield viscosity of 2950 mPa (spindle No. 4, 20 rpm). Dilution with 215 parts water and addition of 265.2 parts of 30% sodium hydroxide solution gives a 21% aqueous solution of the polymer base, having a Brookfield viscosity of 225 mPa (spindle No. 3 100 rpm).

APPLICATION EXAMPLES (A) A dyeing on 100% cotton knit with 3% of the dye C.I. Direct Blue 251 240% is treated at a goods-to-liquor ratio of 1:20 in a freshly prepared bath containing 4% (based on dry substrate) of the free base polymer solution of Example 1, corresponding to 1–1.2% active material, based on substrate.

The after-treatment bath also contains 5 g/l NaCl and is adjusted to pH 12–13 with 2 ml/l sodium hydroxide solution of 36° Bé. Fixation is started at room temperature (approx. 20°) and the bath is heated to 60° and kept at this temperature for 15 minutes. The goods are then rinsed and neutralized with acetic acid.

(B) A 100% cotton fabric is dyed with 3% of the dyestuff of Example 2 of British Patent 2 112 799 B and after-treated with 3% of the free base polymer solution of Example 1, according to Application Example A.

In both A and B, dyeings with excellent permanent wet-fastness are obtained, with minimal effect upon the shade of the dyes.

(C) A dyeing with 3% of the dyestuff C.I. Reactive Blue 79 is rinsed and lightly soaped. Without aftertreatment the dyeing has unsatisfactory wet fastness properties, and poor perborate fastness.

Aftertreatment according to Application Example A gives a dyeing with significantly improved wet fastness, including wash fastness, and fastness to perforate.

(D) A 100% cotton fabric is treated for 20 minutes at 60° at a 1:20 goods to liquor ratio in a liquor containing 3% (based on dry weight of substrate) of the polymer free base solution of Example 1, adjusted to pH 10-12. The fabric is then rinsed, neutralised and dried.

The pretreated fabric is then dyed by a short pad-bath process in which the sample is padded with a liquor containing 27 g/l of the dyestuff C.I. Reactive Red 171 and adjusted to pH 4.5 with acetic acid. The uptake is 80-90% of the dry substrate weight. Finally the fabric is rolled up, wrapped in plastic film and left to stand for 30 minutes. Finally the fabric is hot and cold rinsed and dried by conventional methods.

In spite of the short fixation time a deeper dyeing with better fastness properties is obtained in comparison with the same dyeing without the pretreatment step.

The padding can also be carried out in the presence of a non-ionic surfactant. Equally good results may also be obtained with 5 g/l C.I. Reactive Red 5 or C.I. Reactive Blue 163.

What is claimed is:

1. A process for the production of a water-soluble, high molecular weight linear polymer of a diallyamine, in which polymer all of the monomer units are diallylamine units, said process comprising the step of polymerizing monomers consisting of diallylamine salts in a polar solvent in the presence of a cationic azo initiator and of a regulator.

2. A process according to claim 1 in which the monomer is unsubstituted diallylamine in salt form.

3. A process according to claim 1 in which the cationic azo initiator is selected from 2,2'-azo-bis(2-aminopropane) dihydrochloride, 2,2'-azo-bis (2-amidinobutane) dihydrochloride, 2,2'-azo-bis(N-phenylamidinopropane) dihydrochloride, 2,2'-azo-bis(N,N-dimethylamidinopropane) dihydrochloride, 2,2'-azo-bis(N-hydroxyethylamidinopropane) dihydrochloride, and 2,2'-azo-bis(2-imidazolinylpropane) dihydrochloride.

4. A process according to claim 1 in which the regulator is phosphorous acid or a derivative thereof.

5. A process according to claim 4 in which the regulator is used in an amount from 0.025 to 0.2 molar equivalents based on the monomeric diallylamine.

6. A process according to claim 1 in which the polar solvent is aqueous acid of pH 1.5-5.

7. A water-soluble high molecular weight linear polymer of a diallylamine prepared by the process of claim 1, in which polymer all of the monomer units are diallylamine units.

8. A water-soluble high molecular weight linear polymer of a diallylamine in which polymer all of the monomer units are diallylamine units, said polymer having a Brookfield viscosity in hydrochloride salt form of from 500 mPa (spindle No. 4, 100 rpm) to 10 Pa (spindle No. 4, 10 rpm) in 55-65% aqueous solution at room temperature, and in the free base form from 100 mPa (spindle No. 3, 100 rpm) to 2 Pa (spindle No. 4, 100 rpm) in 20-30% aqueous solution at room temperature, and having a residual monomer content of less than 3% by weight.

9. A water-soluble, high molecular weight linear polymer of a diallylamine, in which polymer all of the monomer units are diallylamine units, said polymer having repeating units of formula III and/or IV

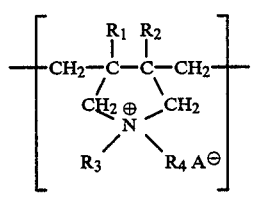

III

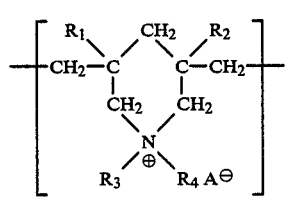

IV in which $R_1$ and $R_2$ are independently hydrogen or methyl;

$R_3$ and $R_4$ are independently hydrogen; $C_{1-5}$ alkyl unsubstituted or monosubstituted with hydroxy, cyano, amino, $C_{1-5}$ alkylamino or di($C_{1-5}$ alkyl)amino; benzyl; nuclear-substituted benzyl; or cyclohexyl; or $R_3$ and $R_4$, together with the nitrogen atom to which they are attached, form a piperidine or morpholine ring; and $X^\ominus$ is an anion.

10. A process according to claim 1 wherein the diallylamine salt is of formula I

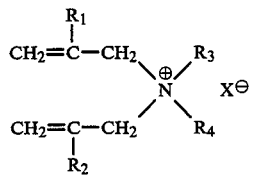

(I)

in which $R_1$ and $R_2$ are independently hydrogen or methyl;

$R_3$ and $R_4$ are independently hydrogen; $C_{1-5}$ alkyl unsubstituted or monosubstituted with hydroxy, cyano, amino, $C_{1-5}$ alkylamino or di($C_{1-5}$ alkyl) amino; benzyl; or cyclohexyl; or $R_3$ and $R_4$, together with the nitrogen atom to which they are attached, form a piperidine or morpholine ring; and $X^\ominus$ is an anion.

11. A process according to claim 1 wherein the cationic azo initiator is a compound of formula II $$(T_5-N=N-R_6)_n^\oplus (X^\ominus)_n \qquad (II)$$

in which $R_5$ and $R_6$ are independently alkyl, aryl, alkaryl, or aralkyl, optionally substituted by cyano, at least one of which is substituted by a group containing a cationic nitrogen atom, or $R_5$ and $R_6$ together form an alkylene, alkylalkylene arylalkylene group substituted by a group containing a cationic nitrogen atom;

$X^\ominus$ is an anion; and n is 1 or 2.

12. A process according to claim 1 in which the regulator is phosphorous acid or an organic phosphite ester.

13. A process according to claim 1 in which the regulator is phosphorous acid.

14. A process according to claim 10 in which, in the compound of formula I, $R_1$ and $R_2$ are hydrogen:

$R_3$ and $R_4$ are hydrogen, $C_{1-3}$alkyl, 2-hydroxyethyl or 2-cyanoethyl; and $x^\ominus$ is $Cl^\ominus$, $Br^\ominus$, $I^\ominus$, $NO_3^\ominus$, $HS_4^\ominus$ or $H_2PO_4^\ominus$.

15. A process according to claim 10 in which the regulator is phosphorous acid or an organic phosphite ester and the cationic azo initiator is a compound of formula II

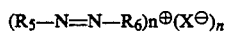  (II)

in which $R_5$ and $R_6$ are independently alkyl, aryl, alkaryl, or aralkyl, optionally substituted by cyano, at least one of which is substituted by a group containing a cationic nitrogen atom, or $R_5$ and $R_6$ together form an alkylene, alkylalkylene or arylalkylene group substituted by a group containing a cationic nitrogen atom;

$X^\ominus$ is an anion; and n is 1 or 2.

16. A process according to claim 10 in which the regulator is phosphorous acid or an organic phosphite ester cationic azo initiator is a member selected from the group consisting of 2,2'-azo-bis(2-aminopropane) dihydrochloride, 2,2'-azo-bis(2-amidinobutane) dihydrochloride, 2,2'-azo-bis(N-phenylamidinopropane) dihydrochloride, 2,2'-azo-bis(N,N-dimethylamidinopropane) dihydrochloride, 2,2'-azo-bis(N-hydroxyethylamidinopropane) dihydrochloride, and 2,2'-azo-bis(2-imidazolinylpropane) dihydrochloride.

17. A process according to claim 14 in which the regulator is phosphorous acid or an organic phosphite ester and the cationic azo initiator is a member selected from the group consisting of 2,2'-azo-bis(2-aminopropane) dihydrochloride, 2,2'-azo-bis(2-amidinobutane) dihydrochloride, 2,2'-azo-bis(N-phenylaminidinopropane) dihydrochloride, 2,2'-azo-bis(N,N-dimethylaminidinopropane) dihydrochloride, 2,2'-azo-bis(N-hydrpoxyethylamidinopropane) dihydrochloride, and 2,2'-azo-bis(2-imidazolinylpropane) dihydrochloride.

18. A process according to claim 15 in which the regulator is phosphorous acid.

19. A process according to claim 15 in which the regulator is present in an amount of 0.01 to 0.5 molar equivalents based on the diallylamine salt and the initiator is used in an amount of 0.2 to 10%, by weight, based on the weight of diallylamine salt.

20. A process according to claim 16 in which the regulator is present in an amount of 0.01 to 0.5 molar equivalents based on the diallylamine salt and the initiator is used in an amount of 0.2 to 10%, by weight, based on the weight of diallylamine salt.

21. A process according to claim 20 in which the initiator is phosphorous acid.

22. A polymer according to claim 7 having a Brookfield viscosity in hydrochloride salt form of from 500 mPa (spindle No. 4, 100 rpm) to 10 Pa (spindle No. 4, 10 rpm) in 15–65% aqueous solution at room temperature, and in the free base form from 100 mPa (spindle No. 3, 100 rpm) to 2 Pa (spindle No. 4, 100 rpm) in 20–30% aqueous solution at room temperature, and having a residual monomer content of less than 3% by weight.

23. A water-soluble, high molecular weight linear polymer in which all of the monomer units are diallylamine units prepared by the process of claim 15.

24. A water-soluble, high molecular weight linear polymer in which all of the monomer units are diallylamine units prepared by the process of claim 21.

25. A polymer according to claim 23 having a Brookfield viscosity in hydrochloride salt form of from 500 mPa (spindle No. 4, 100 rpm) to 10 Pa (spindle No. 4, 10 rpm) in 55–65% aqueous solution at room temperature, and in the free base form from 100 mPa (spindle No. 3, 100 rpm) to 2 Pa (spindle No. 4, 100 rpm) in 20–30% aqueous solution at room temperature, and having a residual monomer content of less than 3% by weight.

26. A polymer according to claim 24 having a Brookfield viscosity in hydrochloride salt form of from 500 mPa (spindle No. 4, 100 rpm) to 10 Pa (spindle No. 4, 10 rpm) in 55–65% aqueous solution at room temperature, and in the free base form from 100 mPa (spindle No. 3, 100 rpm) to 2 Pa (spindle No. 4, 100 rpm) in 20–30% aqueous solution at room temperature, and haing a residual monomer content of less than 3% by weight.

27. A polymer according to claim 9 in which $R_1$ and $R_2$ are hydrogen; $R_3$ and $R_4$ are hydrogen, $C_{1-3}$alkyl, 2-hydroxyethyl or 2-cyanoethyl; and $X^\ominus$ is $Cl^\ominus$, $BR^\ominus$, $I^\ominus$, $NO_3^\ominus$, $HSO_4^\ominus$ or $H_2PO_4^\ominus$.

28. A polymer according to claim 27 wherein $R_3$ and $R_4$ are hydrogen.

* * * * *